United States Patent [19]

Phillips et al.

[11] 4,045,529
[45] Aug. 30, 1977

[54] PROCESS FOR MAKING PRODUCER-COLORED FIBERS, YARNS, FILMS AND RELATED PRODUCTS

[75] Inventors: Bobby M. Phillips; Dale R. Gregory, both of Kingsport, Tenn.

[73] Assignee: Eastman Kodak Company, Rochester, N.Y.

[21] Appl. No.: 618,646

[22] Filed: Oct. 1, 1975

[51] Int. Cl.$^2$ .......................... D01F 1/02; B01D 47/00
[52] U.S. Cl. ............................. 264/75; 260/37 NP; 260/37 P; 260/37 R; 264/171; 264/211
[58] Field of Search ............... 260/408, 37 NP, 37 R, 260/37 P, 39 P, 42.54; 264/211, 171, 78, 73, 75, 349, 176 F; 425/132, 142, 192 R, 376

[56] References Cited
U.S. PATENT DOCUMENTS

| 2,063,180 | 12/1936 | Meyer et al. | 264/171 |
| 3,752,874 | 8/1973 | Coates | 264/176 F |
| 3,817,675 | 6/1974 | Maiocco | 264/211 |
| 3,905,937 | 9/1975 | Khanna | 260/40 P |
| 3,969,053 | 7/1976 | Baconnier et al. | 264/211 |

| T903,029 | 10/1972 | Phillips | 264/349 |

FOREIGN PATENT DOCUMENTS

| 45-23424 | 8/1970 | Japan | 264/171 |
| 46-27776 | 8/1971 | Japan | 264/171 |

Primary Examiner—Jay H. Woo
Attorney, Agent, or Firm—Malcolm G. Dunn; Daniel B. Reece, III

[57] ABSTRACT

Process for making producer-colored fibers, yarns, films and related products by extruding from a source, such as from an extruder, a flow of polymer to a spinneret placing in the path of flow between the polymer flow and the spinneret a dye solid or pigment solid having a predetermined shaped surface area, and flowing the polymer into contact against the exposed surface of the dye solid or pigment solid and by such contact dissolving at a predetermined rate a predetermined portion of the dye solid or pigment solid into the polymer flow and coloring the polymer flow for subsequent extrusion from the spinneret as colored filaments.

8 Claims, 7 Drawing Figures

PROCESS FOR MAKING PRODUCER-COLORED FIBERS, YARNS, FILMS AND RELATED PRODUCTS

BACKGROUND OF THE INVENTION

The present invention is directed to a process for producing one or more colored filaments from a spinneret by dissolving dyes or coloring matter into the polymer flow upstream of the spinneret face but downstream of any extruder.

In the prior art, polymers may be dyed or colored by uniformly introducing the desired pigments or dyes into the polymer during polymerization. A dye concentrate may also be introduced into molten polymer by mixing the two components together and extruding the mixed components for flow to a spinneret. Still another method may involve introducing a concentration with the pelleted polymer feed in an extruder. In any of these methods the entire system must be thoroughly cleaned, including extruders and any conduits leading between the extruder(s) and the spinneret when it becomes necessary to make a color changeover in order to avoid color contamination.

SUMMARY OF THE INVENTION

The process of this invention thus involves extruding from a source, such as from an extruder, a flow of polymer to a spinneret; and dissolving into the polymer flow between the source and the spinneret a predetermined dye or coloring matter.

The polymer may be any suitable polyester, such as poly(ethylene terephthalate), copolymers, nylons, polypropylenes, acrylics, cellulose acetate and other spinning solutions. The dyes employed must, of course, be compatible with the particular polymer in concern, and the melting point of the dye must be greater than the process operating temperature. Also, the dye particle size employed must be such as to remain in place until dissolved, and the dye must be cakeable for certain of the suggested embodiments.

The dissolution of the dye into the polymer occurs by exposing the dye to the flow of polymer and flowing the polymer into contact with the dye.

The dye may be in the form of a cake and be positioned within the spinneret assembly and in the course of time as the polymer flows against the exposed surface of the dye cake the dye cake gradually becomes dissolved. The dye cake may be designed so as to continuously present a constant surface area that will be exposed to the polymer flow as the dye cake becomes gradually dissolved. In this manner the polymer extruding from the spinneret orifices will be uniformly dyed.

The dye cake may also be designed so as to present a nonconstant surface area that will be exposed to the polymer flow and will further continue to present a nonconstant surface area as the dye cake becomes gradually dissolved. In this manner the polymer extruding from the spinneret orifices will be nonuniformly dyed along its length, depending upon the rate of dye dissolution, thereby producing a novelty yarn effect.

The dye may further be in the form of granules held between screens which are continuously moved across the path of the polymer flow above the spinneret in a manner so as to continuously present a new surface area of granules that will be exposed to the flow of the polymer. The concentration of the dye granules between the screens may be constant so as to present in the moving screen arrangement a constant dye surface area to be exposed to the polymer flow. In this manner the polymer extruding from the spinneret orifices will be uniformly dyed.

The concentration of the dye granules between the screens may be nonconstant so as to present in the moving screen arrangement a variable nonconstant dye surface area to be exposed to the polymer flow. In this manner the polymer extruding from the spinneret orifices will be nonuniformly dyed along its length, thereby producing a novelty yarn effect.

The most significant advantage in any of these arrangements is that upon color changeover the source of the polymer flow, the extruder or reactor, will not be contaminated by the dye or coloring matter and will not under normal circumstances have to be cleaned, except, of course, when it becomes necessary for changing the polymer itself. In this manner, a color changeover may be made quickly and with minimum loss of polymer.

The process disclosed herein may be used to make colored fibers, yarns, films, and the products made from such colored films, yarns and films.

Other advantages will be apparent to those skilled in the art to which this invention pertains.

DESCRIPTION OF THE PREFERRED EMBODIMENT

Figure 1:
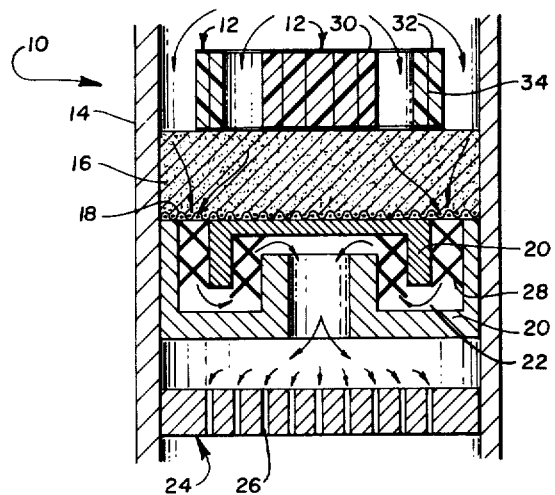
FIG. 1 is an elevation of a cross-section of a spinneret assembly illustrating in the upper portion a dye cake presenting a constant surface area to polymer flow, a sand filter, mixer elements and a spinneret plate with orifices.
Figure 2:
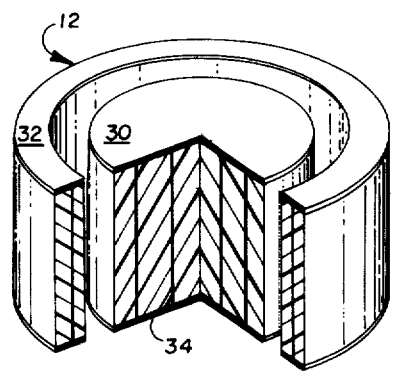
FIG. 2 is an enlarged isometric view, partly broken away and in cross-section, of the dye cake shown in FIG. 1 and further illustrating the support members for the dye cake.

In reference to the drawings, particularly FIG. 1 and 2, the process of this invention may be practiced by providing space within a spinneret pack assembly 10 to receive a dissolvable dye cake 12. The spinneret pack assembly comprises an outer pack wall 14, a sand filter 16 disposed upon a support screen 18, a breaker plate type support 20 defining a flow channel 22 for polymer flowing through the spinneret pack assembly and a spinneret plate 24 defining a plurality of orifices 26 through which polymer is extruded into filaments. A series of stationary mixer elements 28 may be disposed within the flow channel 22 for achieving a thorough mixing of the polymer with the dye, which is dissolved from the dye cake by the polymer flowing into contact with the exposed surfaces of the dye cake. Reference may be made to such patents as U.S. Pat. Nos. 3,577,308, 3,182,965, and 3,806,097 as to the nature and operation of mixer elements in general. In brief, however, it is sufficient to say that the flow through each of the mixer elements is divided and redivided as many times as desired by the number of mixer elements positioned in the spinneret pack assembly and then recombined in a homogeneous colored flow for extrusion through the spinneret plate orifices 26.

The dissolvable dye cake 12 has been designed so as to present a renewable constant surface area continuously exposed to the polymer flow as the dye cake gradually becomes dissolved. For purposes of explaining this constant surface area, FIG. 2 shows the dye cake 12 as a circular solid 30 surrounded by an annular solid 32. As the outer circumference of the circular solid 30 becomes decreased by dissolution into the polymer flow, the inner circumference of the annular solid 32 becomes increased by such dissolution in such manner that the same amount of surface area continues to be exposed to the polymer flow until the moment shortly before the dye cake becomes essentially dissolved or before collapse of one or the other solids 30, 32. In order to assure that such collapse is deferred as long as possible, a series of supporting wires or support members 34 (FIG. 2) are positioned within the dye cake 12 for this purpose.

As previously mentioned, the dye that is employed must be compatible with the polymer in concern. The dye must also be capable of withstanding the temperatures that occur in the spinneret pack assembly. For example, in the use of a polyester polymer such as poly(ethylene terephthalate), a blue dye from 4-(4'-beta hydroxyethylanilino)-5-nitro-1,8-dihydroxyanthraquinone may be used. Also, a yellow dye from 4-[4'-(phenylazo)-phenylazo]phenol may be used. These dyes may be used in the form of cakes within the spinneret pack assembly.

A sand cavity of a spinneret pack assembly was half filled with 40/60 mesh sand, and the remainder of the cavity was filled with a granular blue dye of 5/10 mesh size. The dye had a melting point of 310° C. and dissolved in molten poly(ethylene terephthalate) polymer of 0.60 I.V. (inherent viscosity) at 290° C. at a rate sufficient to provide the desired concentration in the finished polyester fiber. It was observed that the particle size and the amount of dye could be changed to effect filtration as well as coloring. It was also observed in this example that the extruded polyester fibers contained decreasing amounts of dye with time because of reduction in bed depth and surface area of the dye granules with time.

It was also found, however, that a preformed dye cake, such as that disclosed in FIGS. 1 and 2, could be designed such that for constant dissolution rates the surface area of the dye cake would remain constant with time. Ideas from solid rocket propellant technology can be utilized in designs other than that shown in FIG. 2. This eliminates the potential problem of decreasing dye concentration with time, which occurred in the example of the dye granules in one-half of the sand cavity, as mentioned above.

To illustrate further the concept of maintaining a constant surface area as to the particular dye cake design shown in FIGS. 1 and 2, consider the following: The initial outer circumference of the circular solid 30 which is exposed to polymer flow will be called "$C_1$"; the initial inner circumference of the annular solid 32 which is exposed to polymer flow will be called "$C_2$"; the total circumference at any time $t$ will be called "$C_t$"; the outer circumference of circular solid 30 at any time $t$ will be called "$C_{1t}$"; the inner circumference of annular solid 32 at any time $t$ will be called "$C_{2t}$"; $C_1$ is equal to $2\pi R_1$ ($R_1$ being the radius of the circular solid 30); and $C_2$ is equal to $2\pi R_2$ ($R_2$ being the radius of the annular solid 32 extending from the center to the inner circumference of the annular solid. It is submitted that $C_t$ is equal to $C_{1t}$ plus $C_{2t}$ is equal to a constant. To prove this, consider that $$\frac{dC_1}{dt}$$

is equal to the rate of change of the outer circumference of the circular solid 30 with respect to time and that $$\frac{dC_2}{dt}$$

is equal to the rate of change of the inner circumference of the annular solid 32 with respect to time. Since the outer circumference of the circular solid 30 will be decreasing with respect to time, it can be represented as $C_{1t}$ is equal to $$C_1 - \frac{dC_1}{dt} t.$$

Since the inner circumference of the annular solid 32 will be increasing with respect to time, it can be represented by $C_{2t}$ is equal to $$C_2 + \frac{dC_2}{dt} t. \quad \frac{dC_1}{dt} \text{ and } \frac{dC_2}{dt}$$

are both constant and are equal to each other; or $$\frac{dC_1}{dt}$$

is equal to $$2\pi \frac{dR_1}{dt}$$

is equal to $$2\pi \frac{dR_2}{dt}$$

is equal to $$\frac{dC_2}{dt}.$$

Therefore, $C_{1t} + C_{2t}$ is equal to $$C_1 - \frac{dC_1}{dt} t + C_2 + \frac{dC_1}{dt} t$$

is equal to $C_1 + C_2$, since $$-\frac{dC_1}{dt} t \text{ and } +\frac{dC_1}{dt} t$$

will cancel out.

For application of the aforegoing information, assume that there is to be a 5 day melt flow run from a single spinneret pack assembly at the rate of 8 pounds of polymer per hour. In order that the polymer may contain dye having 1% concentration by weight, it is determined that 9.6 pounds of dye cake will be required:

$$\frac{5 \text{ days}}{\text{jet change}} \times \frac{24 \text{ hours}}{\text{day}} \times \frac{8 \text{ pounds}}{\text{hour}} = 960 \text{ pounds}$$

of melt polymer flow for 5 days. One (1) percent of 960 pounds is equal to 9.6 pounds of dye needed for the 5 day run.

The volume of the dye cake is determined to be equal to $$\frac{9.6 \text{ pounds}}{62.4 \text{ pounds per cubic foot} \times 1.5 \text{ specific gravity}}$$

or is equal to 0.103 cubic feet.

The size of the dye cake is limited by the space provided within the spinneret pack assembly, therefore, arbitrarily it is decided that in reference to the dye cake shown in FIG. 2, the overall or total radius, $R_T$, of the dye cake shall be 2.5 inches; the radius $R_1$ of the circular solid 30 shall be 1.125 inches; the radius $R_2$ to the inside diameter of the annular solid 32 shall be 1.375 inches and the gap width (between the two solids) shall be 0.25 inch.

The dye dissolution rate for this particular cake of 4-[4'-(phenylazo)phenylazo]phenol is $$5.04 \times 10^{-4} \frac{\text{lbs. dye}}{\text{hr. in.}^2}$$

Thus the exposed dye cake area required for 1% dye dissolution is $$\frac{9.6 \text{ lbs}}{120 \text{ hrs. Area}} = 5.04 \times 10^{-4}$$

or $$\text{Area} = \frac{9.6 \text{ lbs.}}{120 \text{ hrs. } 5.04 \times 10^{-4} \frac{\text{lbs}}{\text{hr. in.}^2}} = 158.6 \text{ in.}^2$$

The length of the required cake is $$L = \frac{158.6 \text{ in.}^2}{2\pi(R_1 + R_2)} = \frac{158.6 \text{ in.}^2}{2(3.14)(2.5 \text{ in.})} = 10.1 \text{ inches};$$

therefore the volume of the dye cake is $$V = \pi(R_T^2 - R_2^2)L + \pi R_1^2 L$$

$$= 3.14(2.5^2 - 1.375^2)10.1 + 3.14(1.125)^2 10.1$$

$$= 178 \text{ in.}^3$$

In summary of the above calculations: the dye dissolution rate must be determined for the particular dye and type of cake required; the shade desired is selected; the time of run must be selected; and then the length of the particular dye cake can be determined.

Figure 3:
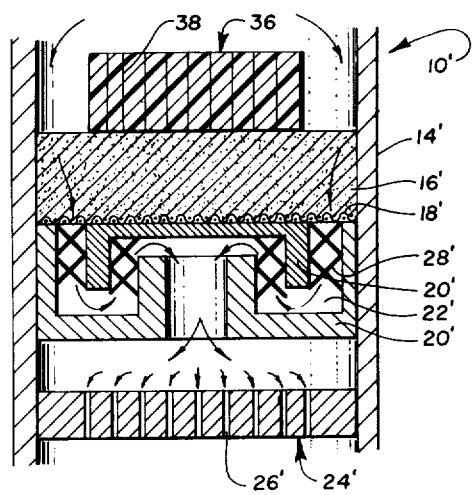
FIG. 3 is an elevation of a cross-section of a spinneret assembly similar to that shown in FIG. 1 except that the dye cake illustrated presents a nonconstant surface area to polymer flow.

In reference to FIG. 3, a different embodiment of the invention is shown. The spinneret pack assembly 10' is the same structure as that disclosed in FIG. 1 but the reference numbers for all corresponding elements having the same functions are primed to show that a different embodiment is concerned.

Space is similarly provided within the spinneret pack assembly 10' to receive a dissolvable dye cake 36, which has been designed so as to present a renewable nonconstant surface area continuously exposed to the polymer flow as the dye cake gradually becomes dissolved. The dye cake may be a circular solid similar to the circular solid 30 shown in FIG. 2 but initially of a greater diameter. The outer circumference of the circular solid becomes gradually decreased by dissolution into the polymer flow as the polymer flows against the circumferential surface. The mixer elements 28', as in the embodiment shown in FIG. 1, similarly divide and redivide the polymer flow having the dissolved dye therein so that the recombined polymer-dye flow will become homogeneously colored prior to extrusion through the spinneret plate 26'. As the outer circumference of the dye cake 36 decreases, less and less surface area will be exposed to the polymer flow with a corresponding decrease in amount of dye dissolved in the polymer flow. The dye cake is sustained from premature collapse by support wires or support members 38. Although the mixer elements continue to provide a homogeneously colored polymer flow to the spinneret orifices 26', in time the color of the polymer flow will become less and less intense, thereby resulting in the production of a novelty yarn, the color of which decreases in intensity gradually along its length.

Figure 4:
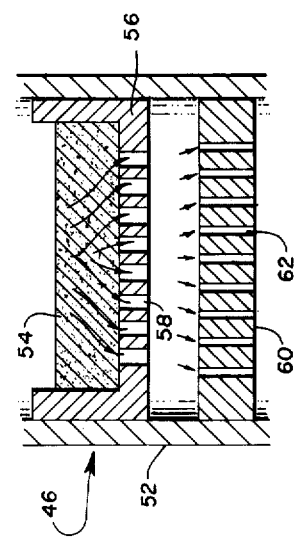
FIG. 4 is an elevation of a cross-section of a modified spinneret assembly coupled with a screen assembly having a uniform concentration of dye granules between the screen layers.
Figure 5:
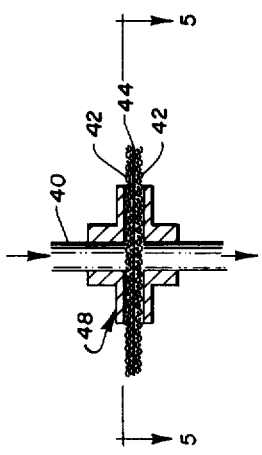
FIG. 5 is a plan view of the screen assembly of FIG. 4 taken along line 5—5 in FIG. 4.
Figure 5:
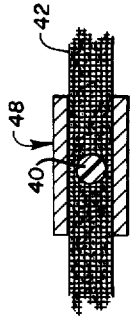

In reference to FIG. 4 and 5, another embodiment of the invention is disclosed wherein a polymer flow passes along a conduit 40 and through layers of screens 42, between which are held dye granules 44, for subsequent flow to a spinneret pack assembly 46. The screens 42 are positioned within a screen holder and seal arrangement 48 and are sealingly movable across the flow path so as to present a continuously renewable screen. Continuously renewable screen arrangements for filtration purposes are well known. See, for instance, U.S. Pat. Nos. 3,471,017 and 3,645,399. A suitable mechanism (not shown) may be provided for causing predetermined rates of movement of the screen in the same manner as known in the art. The screen holder and seal arrangement 48 may be made a part of the spinneret pack assembly.

The spinneret pack assembly 46 may comprise an outer pack wall 52, a sand filter 54, a breaker plate 56 defining a plurality of flow channels 58 for polymer flowing through the spinneret pack assembly and a spinneret plate 60 defining a plurality of orifices 62 through which polymer is extruded into filaments.

The dye granules 44 are uniformly concentrated between the screen layers, as illustrated in FIGS. 4 and 5 so that the exposure of the polymer flow to the dye granules will be essentially uniform.

The rate of screen movement may be suitably controlled so as to achieve a desired color shade.

In this example, a standard sand cavity was filled with 40/60 mesh sand to filter the polymer flow, while the dye was introduced immediately upstream of the sand cavity via the continuously renewable screen arrangement shown in the drawings. The polymer flow was poly(ethylene terephthalate) having an inherent viscosity (I.V.) of 0.60, and the operating temperature was 290° C. The rate of screen movement was controlled to achieve a desired color shade.

Figure 6:
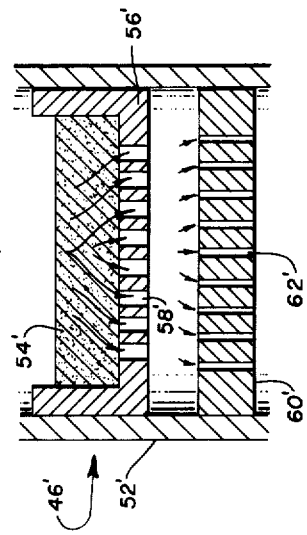
FIG. 6 is an elevation of a cross-section of a spinneret assembly and screen assembly similar to that shown in FIG. 4 except that the screen layers have therebetween a nonuniform dye concentration.
Figure 7:
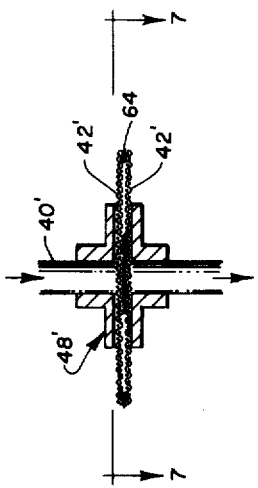
FIG. 7 is a plan view of the screen assembly of FIG. 6 taken along line 7—7 in FIG. 6.
Figure 7:
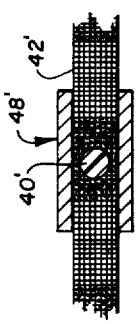

In reference to FIGS. 6 and 7, a different embodiment of the invention is shown than in FIGS. 4 and 5. The screen and holder arrangement 48' and spinneret pack assembly 46' are the same structures as those disclosed in FIGS. 4 and 5, but the reference numbers for all corresponding element having the same functions are primed to show that a different embodiment is concerned.

In FIGS. 6 and 7, the dye granules 64 are shown as being nonuniformly concentrated, and depending upon the rate of screen movement, the dye dissolution into the polymer flow will vary, thereby producing colored yarn filaments varying in shade and intensity along their length.

The concentration of the dye granules between the screen layers can be varied in an infinite number of patterns to achieve any predetermined dye effect for a novelty yarn.

The invention has been described in detail with particular reference to certain preferred embodiments thereof, but it will be understood that variations and modifications can be effected within the spirit and scope of the invention.

We claim:

1. Process for producing one or more colored filaments from a spinneret, the process comprising:
   extruding from a source a flow of polymer to the spinneret,
   placing in the path of flow between the polymer flow and the spinneret a dye solid or pigment solid having a predetermined shaped surface area for continuous exposure to the polymer flow, and
   flowing the polymer into contact against the exposed surface of the dye solid or pigment solid and by such contact dissolving at a predetermined rate a predetermined portion of the dye solid or pigment solid into the polymer flow and with such predetermined portion providing a desired concentration of dye or pigment in the polymer flow.

2. Process as defined in claim 1 wherein a melt flow of polymer is extruded from the source.

3. Process as defined in claim 1 wherein the dye solid or pigment solid is dissolved into a polymer melt flow of poly(ethylene terephthalate).

4. Process as defined in claim 1 wherein the predetermined dye solid or pigment solid is in the form of a cake designed so as to present a constant surface area exposed to the polymer flow, and the step of dissolving a portion of the dye solid or pigment solid includes continuously exposing a new constant surface area of the cake.

5. Process as defined in claim 1 wherein the predetermined dye solid or pigment solid is in the form of a cake designed so as to present a non-constant surface area exposed to the polymer flow, and the step of dissolving a portion of the dye solid or pigment solid includes continuously exposing a new non-constant surface area of the cake.

6. Process as defined in claim 1 wherein the predetermined dye solid or pigment solid is in the form of granules entrapped between layers of a screen that is movable across the path of the polymer flow, and the step of dissolving a portion of the dye solid or pigment solid includes exposing the polymer flow to a continuously renewable source of granules.

7. Process as defined in claim 6 wherein the granules entrapped between the layers of screen present a constant concentration of granules, and the step of exposing the polymer flow to a continuously renewable source of granules includes exposing the polymer flow to the constant concentration of granules.

8. Process as defined in claim 6 wherein the granules entrapped between the layers of screen present a non-constant concentration of granules, and the step of exposing the polymer flow to a continuously renewable source of granules includes exposing the polymer flow to the non-constant concentration of granules.

* * * * *